INVENTORS
RICHARD E. MOORE
DAVID A. RICHARDSON
BY Spencer, Hardman & Feler
THEIR ATTORNEYS Patented June 12, 1951

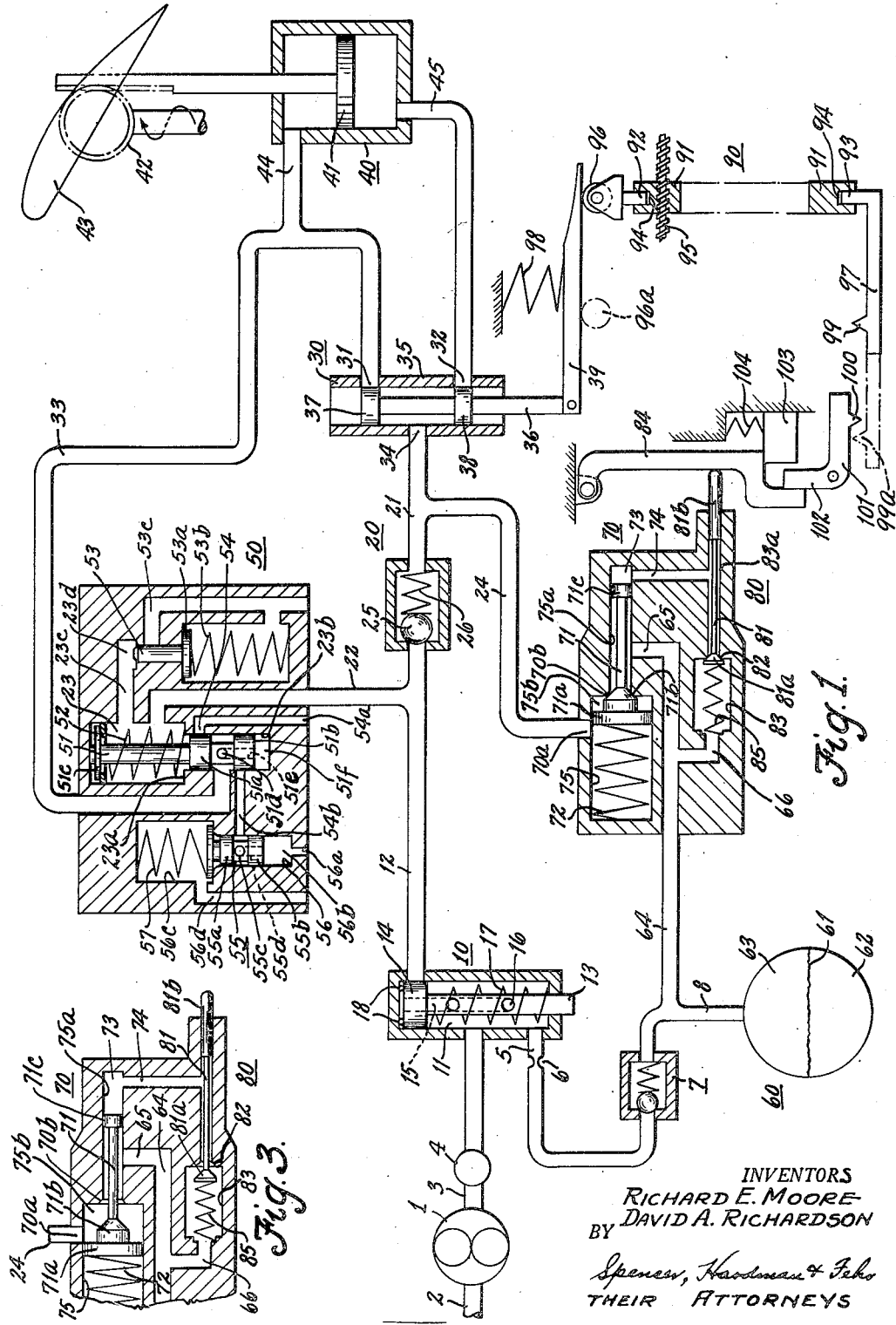

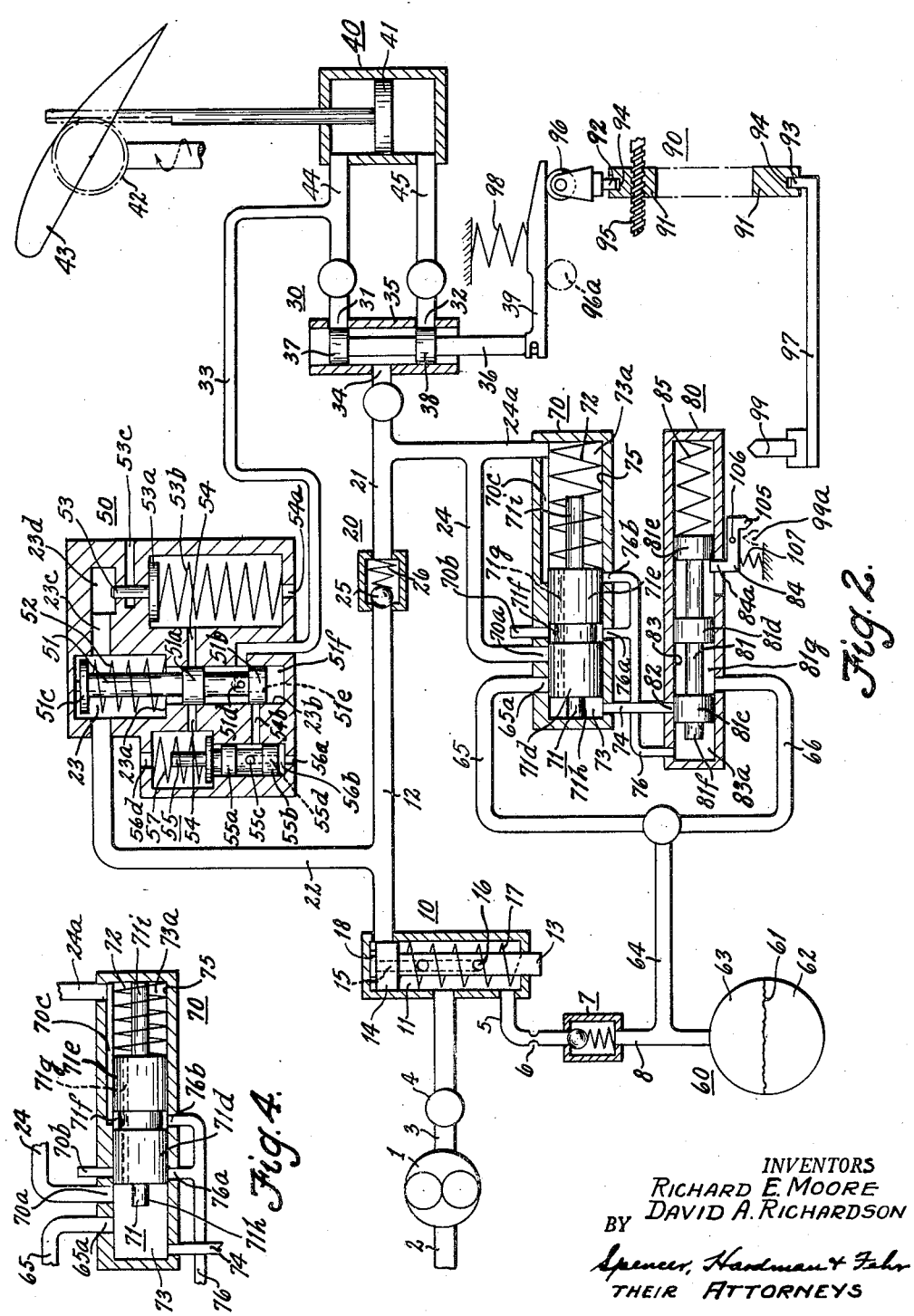

2,556,700

UNITED STATES PATENT OFFICE 2,556,700

PROPELLER CONTROL

Richard E. Moore, Dayton, Ohio, and David Allen Richardson, Broomall, Pa., assignors to General Motors Corporation, Detroit, Mich., a corporation of Delaware Application April 23, 1949, Serial No. 89,192

9 Claims. (Cl. 60—51)

This invention relates to aircraft propellers controlled as to blade angle by fluid pressure systems, particularly those making use of an accumulator or pressure storing device for effecting blade angle changes of considerable magnitude.

It is a principal object of the invention to provide for charge of the accumulator while the propeller is in operation, but without interfering with the fluid circuit feeding the blade angle control means.

A further object of the invention is to provide for accumulator charge that does not take all of the available flow while blade angle or pitch change is required.

Another object of the invention is to provide a system in which the entire volume of the accumulator will be available if necessary to complete the function called for.

Another object of the invention is to provide trip means for maintaining accumulator connection to the system though the system pressure is the higher.

Yet another object of the invention is to provide for applying the accumulator pressure to the system such that it will not be limited or controlled by the pressure control valve of the system.

Further objects and advantages of the present invention will be apparent from the following description, reference being had to the accompanying drawings wherein a preferred embodiment of the present invention is clearly shown.

In the drawings:

Fig. 1 is a schematic view of the fluid circuit for controlling a propeller, with controlled pressure in the pressure line, and a branch line for charging an accumulator under the control of a trip valve selectively admitting the accumulator pressure to the pressure line.

Fig. 2 is a similar view, embodying a modified form of accumulator control valve.

Figs. 3 and 4 represent altered positions of the control valves for the accumulator, shown in Figs. 1 and 2 respectively.

Figure 5:
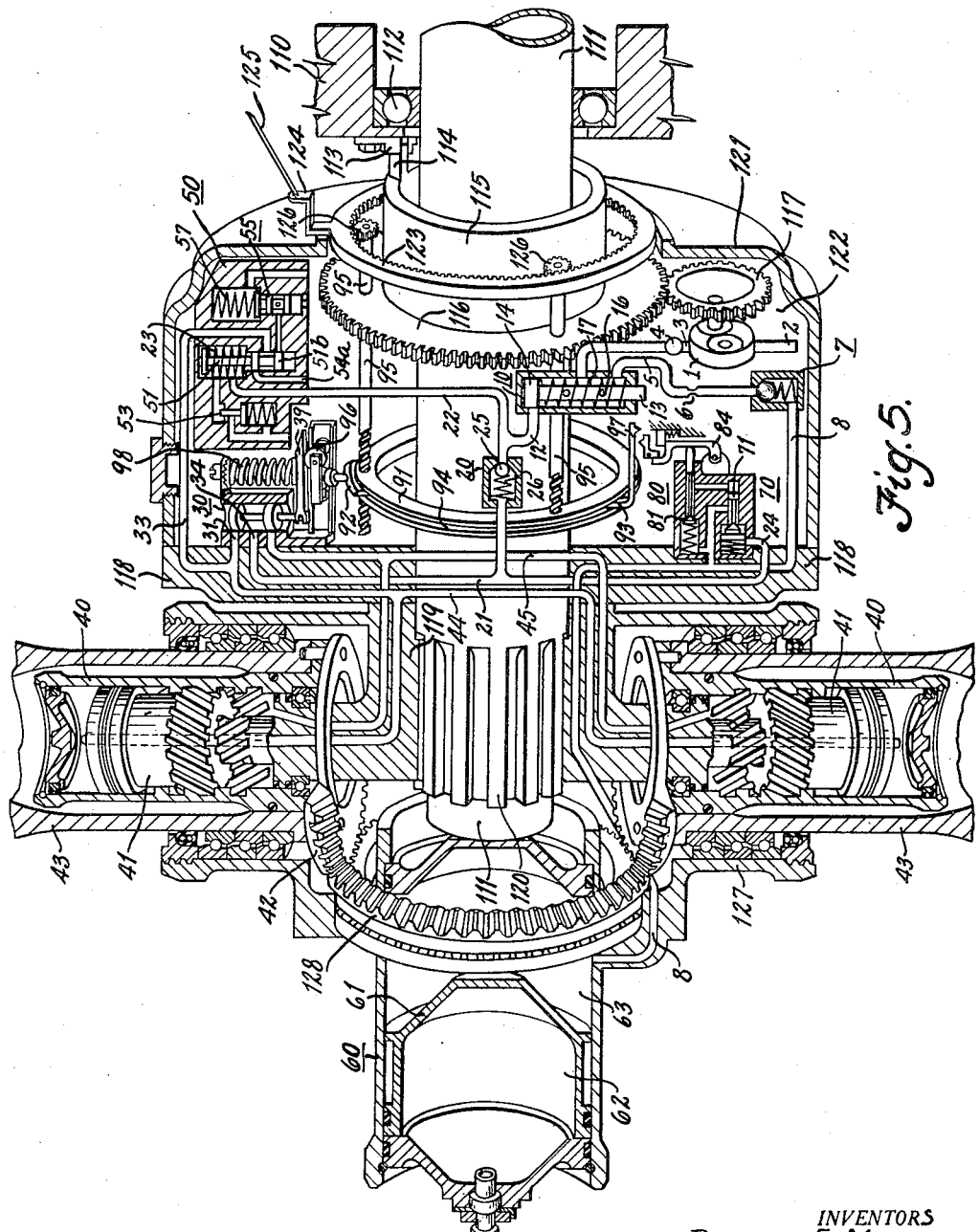
Fig. 5 is a schematic sectional view longitudinally of a propeller mechanism embodying the subject invention, particularly the circuit shown in Fig. 1.

In fluid pressure controlled variable pitch propellers, regulation of the pitch to match the propeller thrust to the power being applied by the engine is effected by the response of a valve, which may be a governor valve of several types, that distributes measured amounts of fluid under pressure to one side or another of a blade operating servomotor. There are also instances when more than measured amounts of fluid under pressure must be applied to the blade operating servomotor for accomplishing a desired blade shift, such as feathering and unfeathering. Those instances may occur without warning, and may also occur while the distributor valve is applying measured amounts of fluid pressure, or is in other words controlling the blade setting. It is therefore essential that a reserve of fluid under pressure be built up quickly and maintained at all times to satisfy the extra demands that would attend those instances if the difficulties are to be overcome.

The instant invention attains the objects and provides for overcoming the difficulties by providing a propeller driven pump with a pressure delivery line to the control apparatus, and incorporating a minimum pressure valve in that line to insure a reserve pressure of proper potential. In the pressure line for effecting the control called for, there is a variable pressure control valve means that insures sufficient pressure be available for completing the control. An accumulator control valve communicates with the accumulator and selectively connects it with the pressure line, by by-passing the minimum pressure and the variable pressure control valves. Thus, accumulator charge and application to the pressure line is thereby independent of the pressure control means.

With detailed reference to the drawings, I refers to a system pump with intake at 2 and which delivers fluid under pressure through outlet 3 and a filter 4 to a chamber 11 of a minimum pressure valve 10 that opens by 5 into an accumulator. From the minimum pressure valve 10 a pressure line 12 connects with a check valve 20 and extends by 21 to a governor distributor valve 30, having outlets 31 and 32 leading to opposite sides of a blade shifting servomotor 40 whose piston 41 actuates a gear 42 turning a blade 43 about its pitch change axis. Tapped into the pressure line 12 between the minimum pressure valve 10 and the check valve 20 there is a branch passage 22 connecting with a chamber 23 of the variable pressure valve 50 whose variable control is completed by a feed-back line 33 extending from the pitch increase line 31. The part 5 is provided with a restriction 6 that slows up flow of fluid from the pump 1 in its passage through accumulator check valve 7 and on by 8 to an accumulator 60 or other fluid storage device. The accumulator comprises a vessel divided by a diaphragm or the like 61 to form a pressure chamber 62 and a fluid storage chamber 63 always open to passage 8 which is branched at 64 to connect with an accumulator control valve assembly 70, 80 for selectively applying accumulator pressure through 24 to the pressure line 21 at a point between the check valve 20 and the distributor valve 30. Selective control of the accumulator pressure control valve is effected by manual operated means 90 as will presently appear.

A minimum pressure is established in the pressure outlet 3, 5 due to the action of the valve unit 10. The chamber 11 is fitted with a plunger 13 headed at 14 to span the bore of the chamber 11, the stem having a bore 15 opening from the face of the head 14 and opening by passages 16 to the outside of the stem to be in communication with the passages 3 and 5. A spring 17 in the chamber 11 disposed about the stem 13 tends to move the head 14 toward the end of the chamber to which is connected the pressure line 12, there being spacing pads 18 to provide a slight spacing between the head and end of chamber 11 for pressure application from the bore 15. In operation, when the pump 1 is operating the output builds up pressure in chamber 11 that is also existent in the passage 5 leading to the restriction 6, and in the bore 15 of the stem which exerts itself against the whole area of the plunger head 14, which is opposed only by the same pressure against an annular area of the head 14 around the stem 13, plus the force of the spring 17 and centrifugal force acting on the plunger and head due to the propeller rotation. The result is that the build-up of pressure will eventually move the head 14 away from the end of the chamber to open the passage into the pressure line 12, thereby establishing a minimum of pressure potential in the passage 3, 5 before any pressure potential appears in the pressure line 12.

That minimum of pressure potential is provided for distribution to the blade shifting servo-motor by means of the distributor valve 30 after moving from the accumulator through the control valve assembly. The fluid under pressure in the line 12 flows through the check valve 20 by displacing the ball check 25 against the spring 26 and flows on through 21 to the pressure supply port 34 of a sleeve 35 providing the ports 31 and 32. A speed responsive plunger 36 has lands 37 and 38 so spaced as normally to cover the ports 31 and 32 respectively, the end of the plunger 36 being pivotally joined to a lever 39 for transmitting spring force to the valve plunger 36 in opposition to centrifugal force resulting from rotation of the propeller on which the control mechanism is mounted. In the drawings the distributor valve 30 is illustrated in the equilibrium position in which the lands 37 and 38 stop flow of fluid from the pressure supply port 34 to either of the pitch change ports 31 and 32. Under those conditions there is no appreciable relief for the pressure that is being built up in the pressure line 12, 21 due to the continued operation of the pump 1. In this equilibrium position of the distributor valve the build-up of pressure is felt all along the way through the passages 3, 4, 5, 6, 7 and 8 to the accumulator, and all along the way through the chamber 11, 12 and 22 to the chamber 23 of the variable pressure control valve which determines the maximum limit to which the line pressure can reach at any time. It should be apparent, that movement of the distributor valve plunger 36 in either direction along the sleeve 35 from the position closing the ports 31 and 32 will tend to relieve the pressure built up in the line 12, 21. Any movement of 36 from the port covering position permits fluid under pressure to flow from port 34 to either port 31 or 32 and thence by either passage 44 or 45 to one side or the other of the piston 41 of the servo-motor 40. Thus, the system must not only provide means for protecting the fluid pressure lines against damage from excessive pressure, but must also be provided with means for insuring that there will be sufficient pressure available in the pressure line at all times to completely and quickly perform any degree of operation called for by the distributor valve.

The variable pressure control valve provides sufficient control over the potential of pressure in the pressure line during the normal propeller operating conditions even though of the most critical demands, and the accumulator with its control mechanism are sufficient to take care of any emergency, as will presently appear. The build-up of pressure in the pressure line 12 is applied through 22 to chamber 23 of the unit 50, which chamber is traversed by a plunger 51 carrying lands 51a and 51b and damping head 51c engaged by a spring 52 and seated on a shoulder 23a joining a reduced bore 23b surrounding the lands 51a and 51b. From the chamber 23 a passage 23c extends to a chamber 23d into which projects the stem 53 of a headed plunger 53a urged by a spring 53b to close a relief passage 53c. Upon the rise of pressure to an excessive value, the plunger 53 will be moved downward to establish communication between chamber 23d and relief passage 53c, which spills back into the reservoir supplying the intake 2 of the pump.

The pressure within the system rarely reaches that point of blow-off due to the action of plunger 51 in first relieving pressure from the chamber 23 through port 54 and 54a to the reservoir, because the pressure in chamber 23 applies to the annular area around the plunger 51 against the end of the land 51a and opposes the force of spring 52 and centrifugal force on the plunger assembly tending to move the plunger and lands toward the top of the view. When the pressure on that annular area predominates the plunger 51 moves downward and uncovers the blow-off port 54 which reduces the pressure in chamber 23 and consequently the pressure in the line 12. That reduction of pressure is variably resisted by an additional force applied from the pitch increase line 44 through the passage 33 that opens into the reduced bore 23b housing the spaced lands 51a and 51b. A neck portion between the lands 51a and 51b is apertured at 51d to open into an axial bore 51e communicating with a chamber 51f of the reduced bore 23, making it possible for the pressure in 33 to be applied against the whole area at the end of the land 51b in assisting relation to the centrifugal force and force of the spring 52 moving the valve plunger to a closing position with respect to the port 54. While the land 51a is closing port 54, the land 51b is also closing a passage 54b leading to a leak valve 55 having lands 55a and 55b housed in a bore 56 opening with a leak orifice 56a into the reservoir. The neck portion between the lands 55a and 55b opens by 55c to an axial bore 55d communicating with the leak chamber 56b. A spring 57 resists upward movement of the valve 55 since the spring is housed in an enlargement 56c of the bore 56, a relief or venting passage being provided at 56d.

When the valve plunger 36 moves away from the covering relation with respect to ports 31 and 32, there is connection of the supply port 34 with one or the other of the pitch shift ports 31 and 32 which connection gives rise to a momentary reduction in pressure in the pressure line 12, 21 and which is transmitted to the chamber 23 of the pressure control valve. The fall of pressure there permits the lands 51a and 51b to move up slightly closing off somewhat, if not altogether, the ports 54 and 54b, thereby immediately raising the potential of pressure in the line 12, 21, to meet the pressure demands of the ports 31 and 32. If it is an instance in which the valve plunger 36 moves upwardly to connect port 34 with port 31, as for increase pitch shift which usually requires the expenditure of more energy, then in addition to the increase of pressure provided by the movement of valve 51 to close the ports because of lessened pressure on the area of land 51a, there is applied the influence of the pressure from 44 through 33 to the under side of land 51b, or to chamber 51f which assists centrifugal and spring force on the valve 51 in closing the ports 54 and 54b. That results because the pressure applied at the neck of the valve 51 between the lands 51a and 51b passes through 51d and 51e to the chamber 51f where it is applied against the whole area of the land 51b and cancels out the effect of the pressure from 22 upon the end area of land 51a, presuming that the pressures in passages 12 and 33 connected by parts 34 and 31 are equal.

During normal operation of the propeller while it is being regulated or governed by the distributing valve, there is designedly a bounteous supply of fluid under pressure being delivered by the pump 1 into the system, the supply being in such surplus over what is needed for continued on-speed operation that there will be more or less a continual discharge from passages 54a, 56a and 56d (Fig. 2) into the reservoir. In the on-speed condition there is usually sufficient cracking of the covering relation of land 37 and port 31 that the pressure from port 34 will be maintained thru port 31 to the increase pitch side of the servo-motor 40. That pressure is designed to oppose the natural tendency of the blade to turn on its pitch axis toward a pitch decreased position. Flow may occur in passage 33 to the neck of valve 51 between the lands 51a and 51b and through 54b when not completely covered by land 51b, to the neck of valve 55 between the lands 55a and 55b to flow through 55c and 55d to chamber 56b and finally through the leak orifice 56a. The rate of leak through 56a is controlled at two points. Under medium pressure conditions in chamber 23 the land 51b may only partly uncover opening 54b such that when an increasing pressure pulse is applied through 33, that pressure will work through the passages 51d and 51e in the chamber 51f to completely cover the passage 54b. Then the flow to the leak valve is completely cut off. If the pressure in chamber 23 is so high that passage 54b is wholly open then a pulse of pressure applied through 33 may flow therethrough to the neck of the leak valve 55. There it flows through 55c and 55d to the chamber 56b, and there if not relieved by flowing through the leak orifice 56a, exerts against the end face of land 55b to force the valve 55 upward against the spring 57, and in doing so the land 55b at least partially cuts off the flow from passage 54b. In these provisions the system pressure is always maintained at such a potential of pressure that the blade shift called for by the distributing valve is always accomplished.

The charging of the accumulator, and the application of its stored energy does not interfere with the system pressure at any time. By reason of the restriction 6 charge of the accumulator is retarded until the pressure in the line 12, 21 is built up to a minimum value, it then occurring by flow of fluid under pressure through the restriction 6 and check valve 7 to the storage chamber 63 of the accumulator. From the storage chamber 63 of the accumulator the branch 64 leads to the accumulator control valve 70, 80 through branches 65, 66 that end at a pressure actuated valve 71 and a pilot valve 81 respectively. The pressure actuated valve 71 is urged to port closing position by a spring 72, while a pressure chamber 73 has a cross connection 74 to the pilot valve 81 that controls a port 82 admitting accumulator pressure to the chamber 73 for shifting the pressure actuated valve 71. When this valve is actuated it connects the accumulator line 65 to the pressure line 21 by passage 24 at a point between the line check valve 20 and the distributing valve 30. The valves 71 and 81 are housed in bores 75 and 83 respectively, each having proper ports and connections one with another to effect selected operation of the control valve when a trip member 84 is actuated by the pilot.

In the specific form of control valve of Fig. 1, the pressure actuated valve 71 provides a large diameter head 71a traversing the larger section of the bore 75 housing the spring 72 and is adapted to move to either side of a port 70, opening into the passage 24. A coned portion 71b seats on a shoulder 70b at the juncture with a reduced portion 75a of the bore which ends in the pressure chamber 73 heretofore mentioned, and disposed at the end of a piston 71c on the valve 71. The passage 74 leads from the chamber 73 and opens into a reduced portion 83a of the bore 83 for the pilot valve, the reduced portion joining the larger portion by a shoulder forming a seat or port 82 for a conic valve element 81a urged to closing position by a spring 85, the valve 81 having a portion 81b extending out of the bore 83a to engage the trip member 84. As the control valve is shown in Fig. 1, the accumulator pressure is closed off from the pressure line 21, but may be connected thereto by movement of the member 84 to depress the valve 81 which lifts the head 81a from the port 82. When that is done, the fluid under pressure in the accumulator 66 may flow through 64, 66, 83, 82, 83a, and 74 to the pressure chamber 73. That pressure acting on the piston 71c pushes the valve 71 against the spring 72 to lift the coned part 71b from the port 70b so that the accumulator pressure in branch 65 may then flow into bore 75a and through port 70b to the chamber 75b on the right side of the head 71a, which operates to move the head to the left hand side of the port 70a opening to the passage 24. These conditions of the valve are shown in Fig. 3. The accumulator pressure is now directly connected to the line 21 through the elements 64, 65, 75a, 70b, 75b, 70a and 24, and is adapted to flow to the blade moving servo-motor as determined by the position of the distributing valve 30. The valve 71 remains open for that connection so long as there is flow against the right hand side of the head 71a, but as soon as the flow stops, the pressure on opposite sides of the head 71a becomes equal and the valve closes against the port 70b under the influence of the spring 72, the exposed area of the cone 71b being equal to the area of the piston 71c such that there is no moment of force tending to hold the valve 71 open.

In the specific form of control valve assembly shown in Fig. 2, the pressure actuated valve 71 is of cylindrical form having two portions 71d and 71e separated by an annular groove 71f with a longitudinal bleed 71g connecting each end face, there being provided stop portions 71h and 71i adapted to engage the opposite ends of the bore 75 so as to form the pressure chamber 73 and a spring chamber 73a housing the spring 72. In the accumulator closing position of the valve 71 the stop 71h is against the left hand end of the bore 75 so that the portion 71d closes port 65a from the accumulator and port 70a to the pressure line 21. The pressure chamber 73 is connected to the bore 83 of the pilot valve where the port 82 is closed by a cylindrical portion 81c when the valve 81 is maintained in the set position shown. Spaced from the cylindrical portion 81c there is a guide land 81d and an abutment portion 81e engaged by the spring 85 which pushes the valve 81 toward the left as shown to engage a latch 84a on the member 84. In the unlatched position of the valve a stop 81f in the reset chamber 83a may engage the end of the bore 83 when the valve portion 81c uncovers the port 82 which then connects with the groove 81g between the portions 81c and 81d to which the passage 66 is always open, thereby connecting accumulator pressure from 66 through 81g, 82, and 74 to the pressure chamber 73. That fluid connection is made when the member 84 is tripped to release the valve 81 which moves to the left from the illustrated position in Fig. 2 to the position shown in Fig. 4. The accumulator pressure in chamber 73 pushes the valve 71 against the spring 72 until the stop 71i engages the end of the bore 75, in which both ports 65a and 70a are open to the chamber 73 so that accumulator pressure may now flow from 64 through 65, 65a, 73, 70a, and 24 to the line 21 at a point between the system check valve 20 and the distributing valve 30 to be directed to the blade moving servo-motor. The valve 71 in so moving closes a port 76a and opens a port 76b of a passage 76 connecting the reset chamber 83a with the bore 75. In the accumulator closed position of valve 71 the port 76a normally connects with the groove 71f of the valve which is also open in that position to a relief port 70b leading back to the reservoir from which the pump 1 takes up its supply. In the connecting position the ports 70b and 76a are both closed, but the port 76b is open to the groove 71f which now also opens into a groove 70c along the side of the bore 75 and which opens to the passage 24 by means of a pipe 24a. The chamber 73a is always open to the pressure in 21 and the bleed 71g communicates the same pressure to the chamber 73, which in the valve closing position is line pressure. In the connecting position the chamber 73a is exposed to accumulator pressure from 24, 24a, and which penetrates along 70c, around 71f, and through 76b and 76 to chamber 83a where it presses upon the end of 81c to move valve 81 against the spring 85 until the latch 84a drops behind the abutment 81e, thereby closing the port 82 leading to the pressure chamber 73. The accumulator pressure being cut off from the chamber 73 the valve 71 now coasts back to the set position under the action of the spring 72 and the bleed 71g. In other words, the pressure actuated valve 71 continues in the accumulator connecting position so long as the fluid under pressure flows through 65a and 70a, which like the structure shown in Fig. 1 is controlled by the distributing valve 30.

The initial control of the distributing valve 30 is effected by the movement of some member connected with the correlating device 90 embodying a control ring 91 maintained against rotation while the propeller mechanism rotates relative thereto so that shoes 92 and 93 of the rotating device ride in a groove 94. The position of the control ring 91 is controlled by a screw device 95 or otherwise so that the ring may be shifted axially for moving a fulcrum 96 along the length of the lever 39 of the distributing valve 30, and for moving an actuator 97 to start feathering and unfeathering. The lever 39 of the distributor valve is held in contact with the fulcrum 96 by means of a spring 98, and movement of the fulcrum 96 along the length of the lever 39 determines the effect that centrifugal force will have on the valve 36 and lever 39 moving against the force of the spring 98. In the positions shown in Figs. 1 and 2 the valve 36 is shown in the equilibrium during which the propeller would be operating at a selected speed. If the fulcrum 96 is moved to a new position a new set of conditions will obtain at which equilibrium would be established between centrifugal force and the force of spring 98, which gives rise to a different speed of propeller operation. Movement of the fulcrum 96 may be for other than selecting a new speed for propeller operation, such as for feathering or for unfeathering the propellers. That movement involves movement of the fulcrum to a reverse side of the line of force application from the spring 98. If the movement is for feathering the propeller, then the fulcrum will be moved from something like the full line shown to the dotted line position indicated at 96a. Centrifugal force will then be assisting the spring force and the valve 36 will move upwardly to connect supply port 34 with the increase pitch port 31 leading to the servo-motor 40. If the movement is for unfeathering the propeller, then the fulcrum will be moved from the dotted line position at 96a to something like the full line position. Since the propeller is at rest when the fulcrum is moved from the feathering position, there will be no centrifugal force applied to the valve and the spring force will move the valve 36 inward to connect supply port 34 with pitch decrease port 32, leading to the servo-motor 40.

Coincident with moving the fulcrum into and out of the feathering position the actuator 97 is operable to trip the accumulator control valve 70, 80 to supply the power for effecting the shift. In Fig. 1 the actuator 97 has a cam 99 operable to engage a part 100 of a pivoted lever 101 whose arm 102 swings the member 84 in a manner to depress the part 81b of the pilot valve, and start the flow of accumulator pressure as has been described. The member is actuated whether the fulcrum is moved either to or from the feathering position. When the fulcrum is moved to the feathered position at 96a the cam 99 will be at the position 99a preparatory to again trip the member 84 when the fulcrum is moved to the unfeathering position. Should feathering be called for at a time when the propeller is rotating at high speed, it is possible that the controlled pressure in the control line 12, 21 and consequently in the bore 75 of the pressure actuated valve 71 is so high that unseating of the valve 81a would not create sufficient differential on the valve 71 to open the port 70b, for accumulator pressure flow. In order to have the proper connections available for that flow when the speed falls far enough to reduce the line pressure in 75, a centrifugal responsive member 103 is adapted to slide to a position behind the end of member 84 so as to hold the pilot valve open at the port 82. A spring 104 withdraws the member 103 when the speed or pressure falls to a proper value. When the feathering function is completed, all of the parts return to the normal position trapping the remainder of fluid under pressure in the accumulator. In the form shown in Fig. 2, the actuator 97 moves a cam 99 into contact with the riser 105 of the member 84 to rock it about a pivot 106 against a spring 107 tending to maintain the latch 84a in place. Once the latch 84a is withdrawn, the pilot valve 81 moves to the left and stays there until the shift of the pressure actuated valve 71 moves to close the port 76a and connect port 76b with 70c. Therefore high pressure in the lines 12, 21 at the start of feathering will eventually fall so low as to present the required differential on valve 71 and it will shift when the conditions are right for its completing the function. From the dotted line position 99a shown in either view, the actuator may be moved toward the full line position for unfeathering, and that movement again trips the control valve and connects the accumulator with the line as has been described.

Fig. 5 shows an installation of apparatus providing the fluid circuit shown in Fig. 1, and graphically shows a gear casing or engine nosing 110 from which extends a propeller shaft 111 mounted in bearings 112 secured to the nosing, there being clips 113 secured thereon between which engages a lug 114 extending from a sleeve 115 and from which radially extends a toothed flange 116 engaged by a pinion 117 attached to the pump 1. The pump 1 and all of the control elements and connections therebetween are mounted on a plate 118 supported by the propeller hub 119 carried by the shaft 111 to which it is secured in driving relation by means of splines 120 or the like. A cover 121 secured to the edge of the plate 118 encloses all of the control elements and provides a reservoir 122 for storing the fluid medium on which the control mechanism works. The sleeve 115 extends rearwardly out of the reservoir to make connection with the clips 113 and therefore holds the toothed flange 116 against rotation within the reservoir 122 so that rotation of the propeller will cause the pump driving gear 117 to roll around the flange 116 in developing the fluid pressure needed. Outside the cover there is a circular rack 123 having an arm 124 to be oscillated by a rod or wire 125 and in doing so rotate a plurality of pinions 126 provided for the screw shafts 95 that operate to shift the control ring 91 as has been described. The hub 119 provides a plurality of sockets 127 each of which pivotally support a blade 43 that is rotated in a pitch changing sense by the servo-motor piston 40, 41, the rotation of the several blades being equalized by the master gear 128. The accumulator 60 is mounted on the front of the hub and has its fluid connection 8 leading back through the hub to connect with the control valve assembly 70, 80 as has been described. A push or pull on the member 125 will select the operating condition desired by the pilot, and will enable him to select the speed at which the propeller will operate, or will make it possible for the pilot to either feather or unfeather the propeller.

While the embodiment of the present invention as herein disclosed, constitutes a preferred form, it is to be understood that other forms might be adopted.

What is claimed is as follows:

1. Hydraulic control means for an aircraft propeller, comprising in combination, a source of fluid under pressure and a pressure line for conveying the fluid under pressure to pitch control devices including a fluid pressure servo-motor and a distributing valve, a minimum pressure valve in the line between the source and distributing valve, an accumulator and control valve assembly connected to the line and shunting the minimum pressure valve whereby the accumulator may be charged without interfering with the fluid pressure line to the pitch control devices.

2. Hydraulic control means for an aircraft propeller, comprising in combination, a source of fluid under pressure including a pump and a pressure line for conveying the fluid under pressure to pitch control devices including a fluid pressure servo-motor and a distributing valve, pressure storing means including an accumulator, means in the line for insuring a minimum operating pressure to be delivered to the accumulator, variable pressure control means connected to the line for controlling the pressure fluid applied by the distributing valve in accordance with the power needs of the servo-motor, means connecting the accumulator to the pressure line hydraulically ahead of the minimum pressure means, an accumulator control valve assembly hydraulically connecting the accumulator to the pressure line at a point hydraulically after the variable pressure control valve, whereby the regulated fluid pressure from the pump distributed by the distributing valve may be supplemented by accumulator pressure.

3. The combination set forth in claim 2 wherein the accumulator is charged through a restricted passage and check valve exposed to source pressure.

4. The combination set forth in claim 2, wherein the variable pressure control means includes an equal area valve controlling a constant bleed of fluid pressure from the pressure line to the pitch increasing side of the servo-motor.

5. Hydraulic control means for an aircraft propeller, comprising in combination, a source of fluid under pressure and a pressure line for conveying the fluid under pressure to pitch control devices including a fluid pressure servo-motor and a distributing valve, a fluid pressure accumulator and connections to said source for charging the accumulator independent of said pressure line, valve means in said line and exposed to the pressure source for establishing a minimum pressure potential in said accumulator, pressure control means connected with said pressure line for determining the maximum potential of said line, a check valve in said pressure line operable to admit controlled pressure to the distributor valve, and accumulator control means for applying the pressure charge of the accumulator to the pressure line at a point between the said check valve and the distributing valve, so that the accumulator pressure may be added to the pressure line without being altered by the pressure control means.

6. The combination set forth in claim 5, wherein the accumulator control means comprises a hydraulically operated valve exposable to the pressure of the accumulator and to the pressure line, and control valve means for selecting whether the accumulator pressure or the line pressure shall be applied to the hydraulically operated valve, and means whereby the accumulator pressure applied to the hydraulically operated valve will move that valve to a position connecting the accumulator pressure to the line and maintain that valve in the connecting position so long as accumulator pressure flows into the pressure line.

7. The combination set forth in claim 5, wherein the accumulator control means comprises a hydraulically operated valve exposable to the pressure of the accumulator and to the pressure line, and control valve means for selecting whether the accumulator pressure or the line pressure shall be applied to the hydraulically operated valve, and means whereby the accumulator pressure applied to the hydraulically operated valve will move that valve to a position connecting the accumulator pressure to the line and maintain that valve in the connecting position so long as accumulator pressure flows into the pressure line, said last named means including a pivoted lever for actuating the control valve, and a speed responsive member operable to hold the lever in control valve open position.

8. The combination set forth in claim 5, wherein the accumulator control means comprises a hydraulically operated valve exposable to the pressure of the accumulator and to the pressure line, and control valve means for selecting whether the accumulator pressure or the line pressure shall be applied to the hydraulically operated valve, and means whereby the accumulator pressure applied to the hydraulically operated valve will move that valve to a position connecting the accumulator pressure to the line and maintain that valve in the connecting position so long as accumulator pressure flows into the pressure line, said last named means including a spring and an opposing piston face on said hydraulically operated valve exposed to the accumulator pressure during flow from said accumulator.

9. The combination set forth in claim 5, wherein the accumulator control means comprises a hydraulically operated valve exposable to the pressure of the accumulator and to the pressure line, and control valve means for selecting whether the accumulator pressure or the line pressure shall be applied to the hydraulically operated valve, and means whereby the control valve means is spring pressed to normally condition said hydraulically operated valve to interrupt connection between the accumulator and the pressure line, manually operated means are provided for tripping the control valve means for applying the accumulator pressure to the hydraulically operated valve for connecting the accumulator pressure with the pressure line, and means for resetting the control valve means preparatory for a succeeding connection of the accumulator with the pressure line.

RICHARD E. MOORE.
DAVID ALLEN RICHARDSON.

REFERENCES CITED

The following references are of record in the file of this patent:

UNITED STATES PATENTS

| Number | Name | Date |
|---|---|---|
| 1,480,257 | Gerlinger | Jan. 8, 1924 |
| 2,264,375 | Hill et al. | Dec. 2, 1941 |
| 2,392,471 | Fox | Jan. 8, 1946 |
| 2,424,749 | Haines | July 29, 1947 |